May 14, 1929.  J. E. JONES  1,713,284
ROLLER BEARING PIPE CARRIER
Filed Feb. 1, 1927
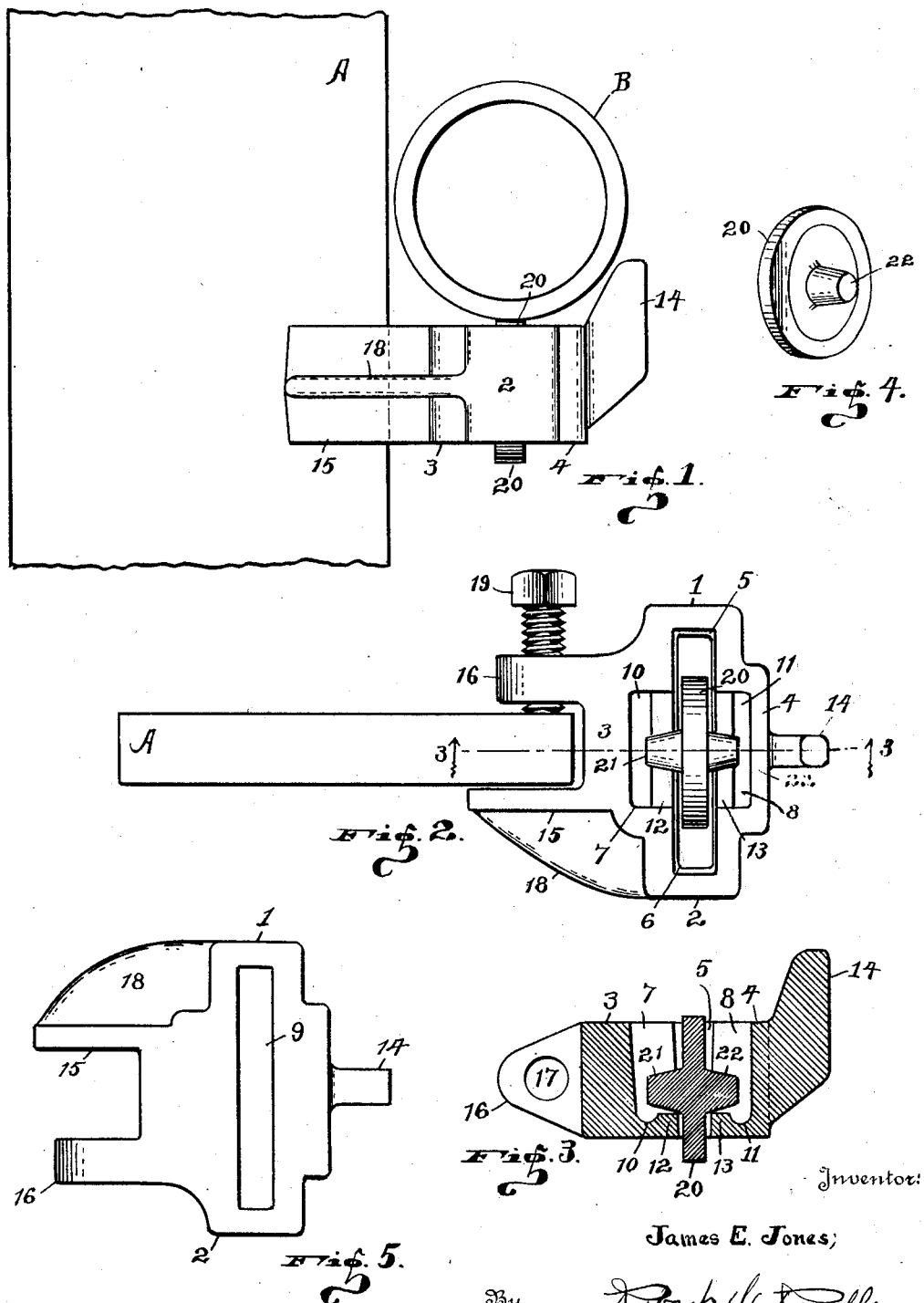
Inventor:
James E. Jones;
By Robert W. Randle,
Attorney.

Patented May 14, 1929.

1,713,284

UNITED STATES PATENT OFFICE.

JAMES E. JONES, OF RICHMOND, INDIANA.

ROLLER-BEARING PIPE CARRIER.

Application filed February 1, 1927. Serial No. 165,111.

The object of my present invention, broadly speaking, is to provide a roller bearing pipe-carrier which is simple in character, strong and durable in construction, automatic in operation after being installed, easy of installation, and which can be manufactured and sold at a comparatively low price.

It should first be understood that when long lines of steam pipes are located, especially in greenhouses, that the expansion and contraction of such lines of pipe amount to considerable, and therefore the brackets for supporting the pipes are frequently loosened, and sometimes broken, also when the length of the line of pipe is considerable the joints in the pipes become broken, and again they are inclined to creep and sometimes buckle or become distorted. Therefore the object of this invention is primarily to overcome said eventualities in a mechanical and efficient manner and without materially increased expense.

The specific object attained by this invention resides in the fact that the pipes are carried on rollers, whereby all friction and strain is eliminated, and especially providing means whereby the pipes may have their maximum degree of endwise movements while at the same time the rollers have only a minimum of lateral movement, that is to say that while the periphery of the roller has a circular movement substantially equal to the horizontal movement of the pipe, yet at the same time the roller will travel a considerable less distance laterally than the pipe. In other words, to be more specific, the lateral travel of the roller will be only approximately one-fourth of the lateral travel of the pipe, and in this fact lies the basic novelty of my invention.

Other objects and advantages of the invention will be brought out in the course of the following description, and that which is new will be correlated in the appended claim.

The preferred means for carrying out the principles of my invention in a practical manner is shown in the accompanying drawings, in which—Figure 1 is a side elevation of my device as in actual practice, showing the standard or post to which the device is attached and showing a pipe carried thereby. Figure 2 is a top plan view of my device, in connection with the post for its support. Figure 3 is a central section taken through the device on the line 3—3 of Fig. 2. Figure 4 is a perspective view of the roller or wheel alone. And Figure 5 is a bottom plan view of the body of the device.

Similar indices denote like parts throughout the several views.

In order that the construction, the operation, and the advantages of this invention may be more fully understood and appreciated, I will now take up a detailed description thereof, in which I will set forth the same as fully and as comprehensively as I may.

In the drawings letter A denotes a vertical standard or post. Letter B denotes a pipe to be carried. It is to be understood that there is to be a row of said posts, with one of my devices secured to each, and that a line of pipe B extends horizontally and rests on each of my devices, whereby the pipe is supported.

The body of my device consists of a single casting, or the like, comprising the end portions 1 and 2, and the side portions 3 and 4. Said parts have a hollow cruciform interior which consists of four cavities 5, 6, 7 and 8 which terminate in the respective portions 1, 2, 3 and 4.

Formed through the bottom is a slot 9, which opens into cavities 5 and 6, and extends therebetween. That is to say, said slot 9 extends from the outer end of the cavity 5 to the outer end of the cavity 6, and through the bottom between said cavities.

Thus it will be seen that there is no bottom to the cavities 5 and 6, however the cavities 7 and 8 have their respective bottoms 10 and 11, for the purpose hereinafter explained.

Extending upward from the bottoms 10 and 11, and adjoining the slot 9, on each side thereof, and parallel therewith, are the respective tracks, or bearing surfaces, 12 and 13.

Projecting outward and upward from the center of the side 4 is the lug or finger 14, with which the pipe B is adapted to engage.

Extending back from the side 3, and from near one end thereof, is the jaw 15. Also extending back from near the other end of the side 3 is the lip 16. The lip 16 and the jaw 15 are spaced apart and are parallel with each other, with the edge portion of the post A adapted to fit therebetween. Formed through the lip 16 is a threaded aperture 17, for the purpose hereinafter stated.

Numeral 18 denotes a strengthening rib, connecting the jaw 15 with the end portion 2.

All of said parts designated by numerals are formed integral with each other, that is to say, they form a single casting.

Threaded into the aperture 17 is a set-screw 19, affording means whereby the casting above described may be rigidly secured to the post A, substantially as shown.

Numeral 20 denotes a solid wheel or roller, the same having the oppositely disposed tapered hubs, 21 and 22, extending out concentric therewith, and formed integral therewith.

The roller, or wheel, 20 is adapted to operate loosely in the slot 9, and in the cavities 5 and 6, with the hubs, 21 and 22, resting revolvably on the respective tracks 12 and 13, and with the roller 20 projecting slightly above the surface of the body, that is, above the members 1, 2, 3 and 4. Said roller should be capable of a small amount of lateral movement in the slot 9, and between the tracks.

The hubs 21 and 22 are formed tapering, thereby causing the roller 20 to be normally centered in the slot 9, whereby it will not be inclined to rub against the sides of the slot 9, or said tracks.

In practice the carriers are secured to their respective posts A, after which the line of pipe is laid, resting it on the periphery of the roller 20, and adapted to touch the edge of the post A, or the lug 14, in order to center it and cause it to be carried entirely by the roller 20, as shown in Fig. 1.

It will now be evident that as the pipe B moves endwise, as in expanding and contracting, it will have a frictionless bearing, in either direction, upon the roller 20, and as the periphery of the roller will travel with the pipe, the hubs, 21 and 22, will simply roll upon their respective tracks 12 and 13.

It will now be seen that as the periphery of the roller is comparatively large, and travels with the pipe, at the same time the hubs being comparatively small, therefore the travel of the roller laterally will be very much less than the lateral travel of the pipe endwise, thereby permitting the tracks for the hubs to be comparatively short, thereby reducing the required length of the body member and also reducing the torsional strain on the body member, and thereby accomplishing the object of the invention.

Another important feature of this construction resides in the fact that should the endwise movement of the pipe be more than that which permits the hubs to travel to the ends of their tracks, there will still be no damage resulting therefrom, as the roller may still continue to revolve with the hubs in contact with the ends of the cavities 7 and 8, with only slight additional amount of friction.

It is to be understood that various changes may be made in the construction, and the arrangement of parts, herein set forth, without departing from the spirit of this invention, and without sacrificing any of the advantages thereof which are new and useful.

Having now fully shown and described my invention, what I claim, and desire to secure by Letters Patent of the United States, is—

A roller bearing pipe carrier comprising in combination, a body member comprising end portions and side portions, there being a hollow cruciform interior of said body with said interior terminating in a cavity in each of said side portions, there being a slot formed through the bottom of the body with its ends opening into said cavities in the end portions, tracks extending up from said bottom and adjoining the sides of said slot, a finger projecting upward and outward from the center of the outer one of said side portions, jaws extending from the inner side portion and adapted to be secured to a vertical post, a wheel having its face formed straight across the entire periphery thereof, outwardly tapering hubs extending concentrically from each side of said wheel and integral therewith, said wheel being adapted to rotate loosely in said slot with the hubs resting on said tracks and with the periphery of the wheel extending above the surface of said body and adapted to support a pipe, with the sides of said pipe adapted to contact with said finger and said post, all substantially as set forth.

JAMES E. JONES.